(12) United States Patent
Lenk

(10) Patent No.: US 7,904,612 B2
(45) Date of Patent: Mar. 8, 2011

(54) TICKET MECHANISM FOR SHARING COMPUTER RESOURCES

(75) Inventor: Peter Steven Lenk, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1804 days.

(21) Appl. No.: 10/887,438

(22) Filed: Jul. 8, 2004

(65) Prior Publication Data

US 2006/0010451 A1   Jan. 12, 2006

(51) Int. Cl.
*G06F 13/14* (2006.01)
*G06F 9/50* (2006.01)

(52) U.S. Cl. ............ 710/17; 710/5; 710/6; 710/15; 710/19; 718/102; 718/104

(58) Field of Classification Search ............... None
See application file for complete search history.

(56) References Cited

U.S. PATENT DOCUMENTS

| | | | | |
|---|---|---|---|---|
| 5,303,391 | A * | 4/1994 | Simcoe et al. | 710/240 |
| 6,374,285 | B1 * | 4/2002 | Scales et al. | 718/104 |
| 7,043,561 | B2 * | 5/2006 | Hosomi | 709/235 |
| 7,194,567 | B2 * | 3/2007 | Ogilvie et al. | 710/310 |

* cited by examiner

*Primary Examiner* — Ilwoo Park
(74) *Attorney, Agent, or Firm* — Yee & Associates, P.C.; Matthew W. Baca

(57) ABSTRACT

Improved administering of shared resources in a computer system. In a preferred embodiment, transaction throughput is improved and potential starvation eliminated by a ticket mechanism. The ticket mechanism provides a wait counter and a service counter. When a requested transaction fails, a wait counter is incremented and a wait value is sent to the requesting transaction source. As transactions are completed at the resource, the service counter is incremented and its value broadcast to transaction sources sharing that resource. When a source holds a wait count value that equals the service count value, the source can retry the transaction successfully.

3 Claims, 4 Drawing Sheets

TICKET MECHANISM FOR SHARING COMPUTER RESOURCES

BACKGROUND OF THE INVENTION

1. Technical Field

The present invention relates generally to sharing of computer resources, and more particularly to a ticket mechanism for sharing computer resources.

2. Description of Related Art

Computer systems have many shared resources, ranging from memory modules or communication paths. Such shared resources are usually finite and can in some cases act as performance bottlenecks. For example, interconnection paths across large multiple processor systems are often narrower than might be desired for optimum system performance. Signal pins and chip real estate generally limit path and queue size due to cost considerations. This can lead to bandwidth mismatches between path segments. The situation is exacerbated where multiple command, request, or data sources (or, more generally, "transaction sources") attempt to use the same physical path.

Transaction queues are normally positioned at the entrance to such bottlenecks in order to manage traffic as it passes from a higher bandwidth segment or link to a lower bandwidth link. Such queues are finite in size and are subject to overflow during heavy traffic periods. Therefore, such queues are normally designed to hold off some of their incoming transactions. This is referred to herein as "flow control." Flow control can take many forms, including transaction retry protocols and busy signals that warn issuers not to bother sending until the signal changes. Such methods of flow control have side effects on system performance. By consuming bandwidth with unsuccessful transactions, retries can seriously affect performance when the demand significantly exceeds the bandwidth of the link. Dedicated busy signals help avoid and often eliminate such wasted attempts, but since their number scales linearly with the source count, their cost quickly becomes prohibitive as the size of the network grows.

Therefore, transaction throughput would be improved and potential starvation avoided by an improved way to moderate high traffic competition for shared resources.

SUMMARY OF THE INVENTION

The present invention teaches improved administering of shared resources in a computer system. In a preferred embodiment, transaction throughput is improved and potential starvation eliminated by a ticket mechanism. The ticket mechanism provides a wait counter and a service counter. When a requested transaction fails due to insufficient space at its target resource or at a queue in the path to that target, a wait counter is incremented and a wait value is sent to the requesting transaction source. As transactions are completed at the resource, the service counter is incremented and its value broadcast to transaction sources sharing that resource. When a transaction source holds a wait count value that equals the service count value, the source can retry the transaction successfully. Other implementations and embodiments are described more fully below.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
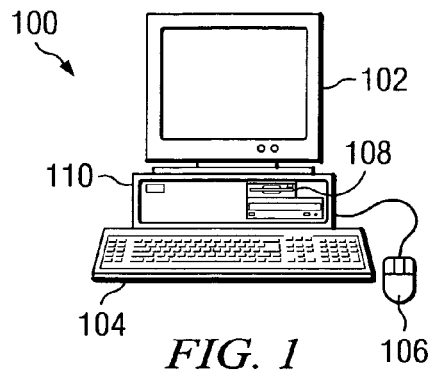
FIG. 1 shows a computer system consistent with implementing a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 102, a video display terminal 104, a keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
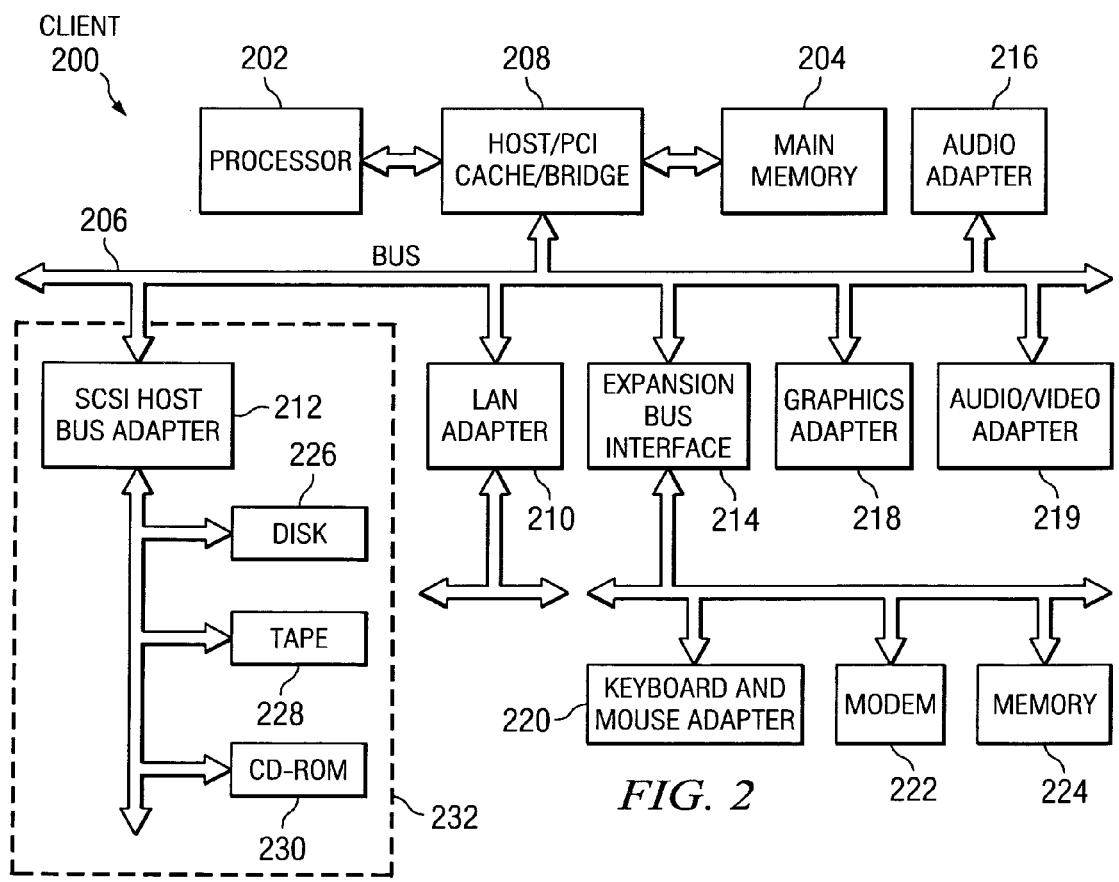
FIG. 2 shows a block diagram of a computer system consistent with implementing a preferred embodiment of the present invention.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

Figure 3:
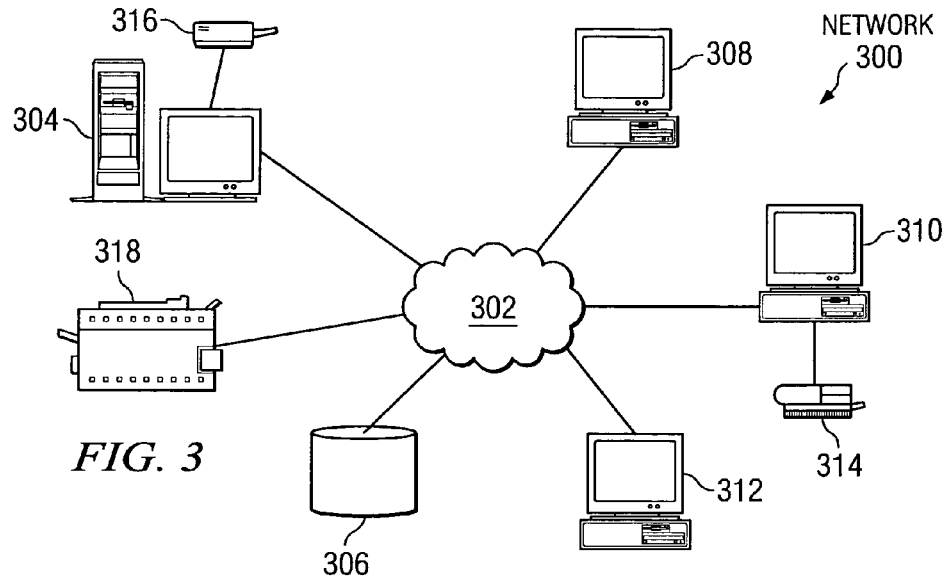
FIG. 3 shows a diagram of a computer network consistent with implementing a preferred embodiment of the present invention.

FIG. 3 depicts a pictorial representation of a network of data processing systems in which the present invention may be implemented. Network data processing system 300 is a network of computers in which the present invention may be implemented. Network data processing system 300 contains a network 302, which is the medium used to provide communications links between various devices and computers connected together within network data processing system 300. Network 302 may include connections, such as wire, wireless communication links, or fiber optic cables.

In the depicted example, a server 304 is connected to network 302 along with storage unit 306. In addition, clients 308, 310, and 312 also are connected to network 302. These clients 308, 310, and 312 may be, for example, personal computers or network computers. In the depicted example, server 304 provides data, such as boot files, operating system images, and applications to clients 308-312. Clients 308, 310, and 312 are clients to server 304. Network data processing system 300 includes printers 314, 316, and 318, and may also include additional servers, clients, and other devices not shown. In the depicted example, network data processing system 300 is the Internet with network 302 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 300 also may be implemented as a number of different types of networks, such as for example, an intranet, a local area network (LAN), or a wide area network (WAN). FIG. 3 is intended as an example, and not as an architectural limitation for the present invention.

The present invention describes a ticketing mechanism that eliminates retry waste for shared resources at a lower cost than dedicated busy signals. Under the description that follows, a snoop protocol is assumed with transactions visible to and monitored by all participants that may need to use the shared resource.

Figure 4:
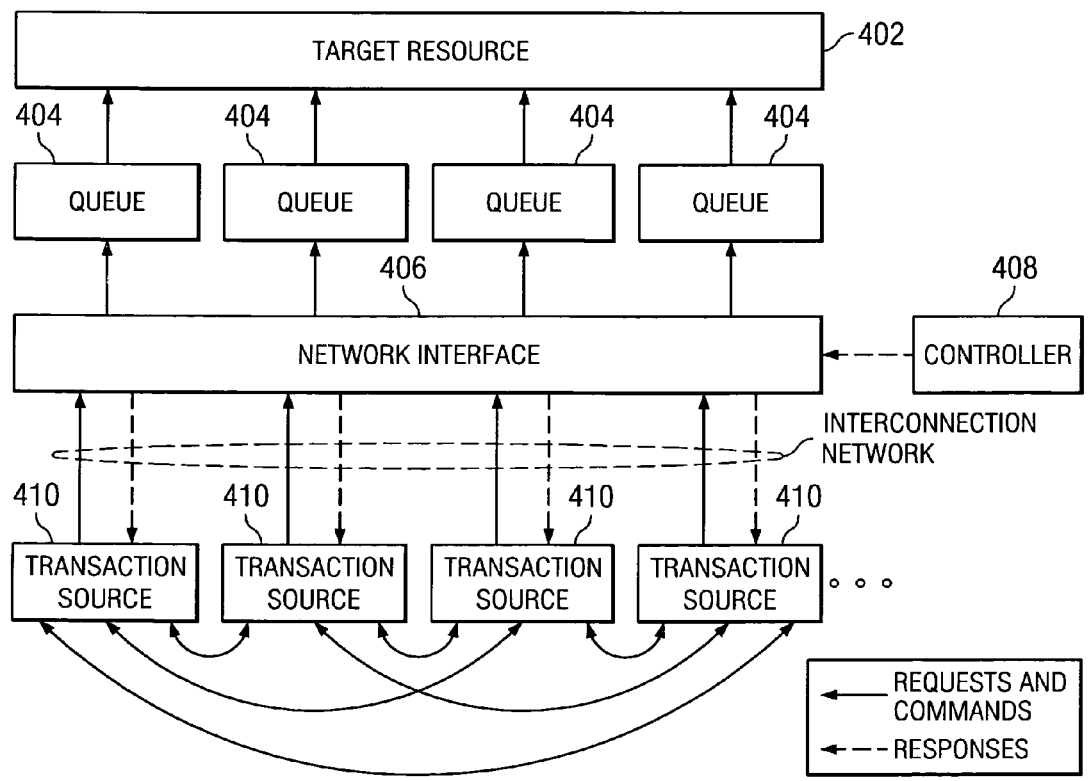
FIG. 4 shows a diagram of shared resources and interconnection network, consistent with implementing a preferred embodiment of the present invention.

FIG. 4 shows an example of interconnection paths in a system consistent with implementing a preferred embodiment of the present invention. In this example, an example target resource 402 is shown, though multiple target resources could also exist. Resource 402 has associated queuing agents 404 that receive and forward transaction requests through network interface 406 from transaction sources 410 to the target resource 402. In this example, controller 408 administers the network interface. In this example, requests and commands are shown using solid arrow lines, while responses are shown using dashed arrow lines.

In a preferred embodiment of the present invention, each target or queuing agent along the path maintains two counters—a Wait counter and a Service counter. The target also generates side band signals to broadcast count values to the transaction sources, or otherwise makes the side band signals available for snooping by the transaction sources. The sideband signals can be implemented in a number of manners. For example, their paths might be full count width or serialized if latency and added resource occupancy times are acceptable. A path could also be dedicated to signals for each counter, or one path could be shared by both counter signals.

Figure 5:
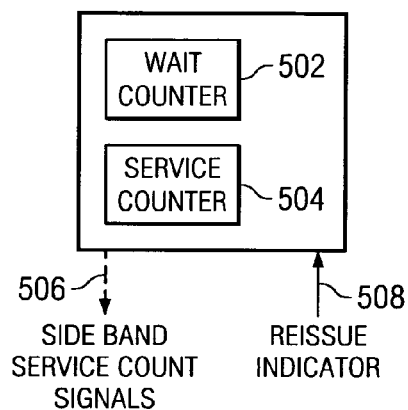
FIG. 5 shows a diagram of the ticket counter according to a preferred embodiment of the present invention.

FIG. 5 shows an example of counters associated with target resource 402. In this example, target 402 includes wait counter 502 and service counter 504. These counters are used in preferred embodiments of the present invention to alert transaction sources that their request has been denied and also when they can expect a successful transaction. For example, in one implementation, whenever a transaction source makes a request of the target resource, if the target resource is unable to fulfill that request, for example, because of previous pending requests, then the target resource responds by sending to the transaction source a ticket that includes a value for a wait count, as indicated by the wait counter of the target. This value indicates when the transaction can be reattempted. The target then increments its wait counter. The transaction source saves the received wait count value, maintaining its association with the failed transaction. That transaction should not be reattempted until the source has been notified that its associated ticket number is next in line. As transactions are serviced at the target resource, its service counter 504 is incremented and sideband service count signals 506 are broadcast to (and preferably snooped by) the pool of transaction sources that may have issued a transaction to that target resource. When a transaction source holding a ticket (i.e., a source that has attempted a transaction but has been denied and issued a wait count) receives the service count signal, it compares the received service count to all of its active wait count values. When the source is notified that its ticket number is next in line or available (e.g., the wait count equals the service count, depending on the embodiment), the source reattempts the transaction, including a reissue indicator 508 with assurance that the transaction will be accepted.

Each time the target frees a resource and is ready to handle another transaction, it increments its service counter and broadcasts the latest service count. The target must reserve this resource so that the reissued operation can avoid another busy/retry. As sources monitor network traffic, they compare snooped service counts with all valid entries in their pending transaction queue, described in FIG. 6, below. If the service count value matches the wait count for a valid entry, the source resends the operation to the target.

A reissued transaction 508 should be tagged as such so that the reserved target resource can be used and then released for another operation. The resource cannot be reserved indefinitely. Either the transaction's source must eventually reissue the operation once it has received the appropriate signal (i.e., the broadcast service count matches a held wait count), or the target must release the held resource after waiting an appropriate time period.

Figure 6:
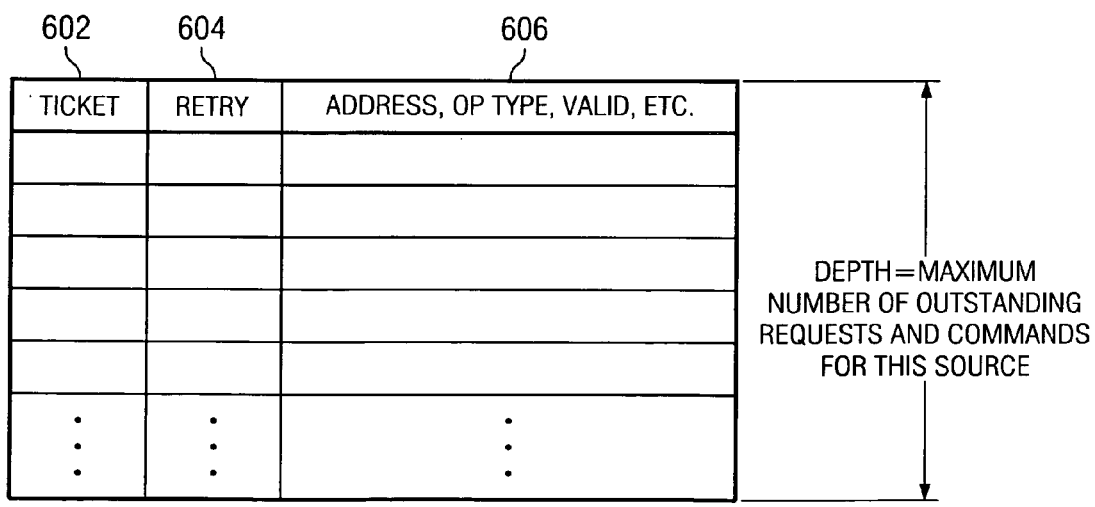
FIG. 6 shows a pending transaction table of a transaction source according to a preferred embodiment of the present invention.

FIG. 6 shows the pending transaction table maintained for transaction sources. Sources maintain these queues for use in tracking all outstanding transactions. Each entry contains a retry indicator 604 and the ticket number 602, as well as other information 606 to maintain transaction status, such as the operation type, the target address, and validity. Each source is therefore responsible for keeping track of its failed operations and their positions in line. If cost is acceptable, the ticket bit width should be sufficient to uniquely identify each transaction among the maximum number simultaneously possible across the system. Cost efficiencies might reduce the size. In preferred embodiments, three or four bits are used to cover 8 to 16 contending sources.

Figure 7:
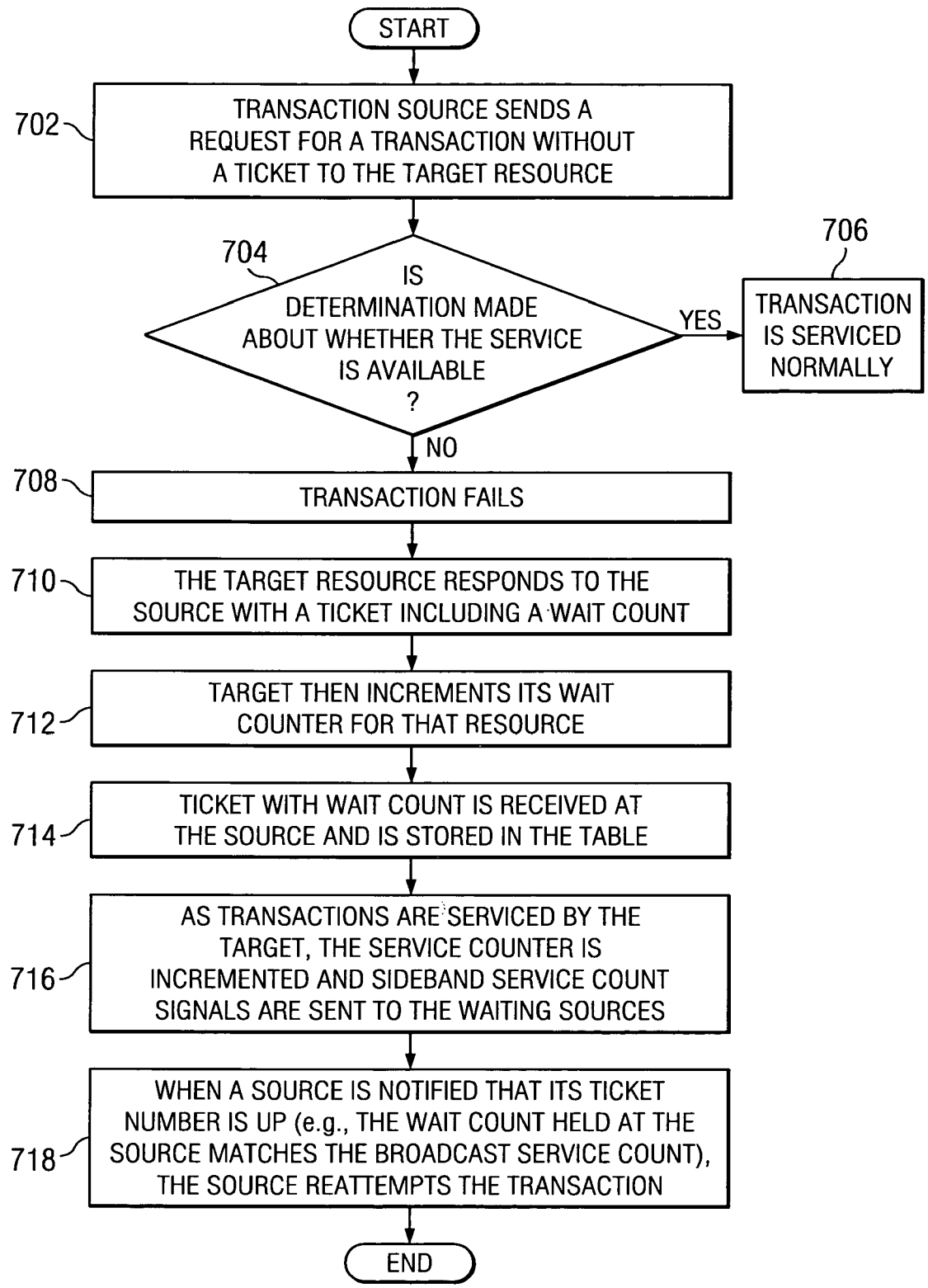
FIG. 7 shows a flowchart of process steps for implementing a preferred embodiment of the present invention.

Transactions are normally attempted for the first time without a ticket, in the expectation that the first attempt will often succeed. FIG. 7 shows process steps for implementing a preferred embodiment of the present invention. First, a transaction source sends a request for a transaction without a ticket to the target resource (step 702). Next a determination is made about whether the service is available (step 704). If it is, then the transaction is serviced normally (step 706). If not, the transaction fails (step 708). In this case, the target resource responds to the source with a ticket including a wait count (step 710). The target then increments its wait counter for that resource (step 712). The ticket with wait count is received at the source and is stored in the table (step 714) described above with reference to FIG. 6. As transactions are serviced by the target, the service counter is incremented and sideband service count signals are sent to (e.g., snooped by) the waiting sources (step 716). When a source is notified that its ticket number is up (e.g., the wait count held at the source matches the broadcast service count), the source reattempts the transaction (step 718).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer system having shared resources, comprising:

at least one transaction source, the at least one transaction source having a pending transaction table;

at least one target resource, the at least one target resource having an associated wait counter and an associated service counter;

an interconnection network through which data is passed between the at least one transaction source and the at least one target resource;

a computer having a processor and a computer readable memory operably coupled to a computer readable storage device;

first program instructions to determine whether a transaction, requested from a target resource by a transaction source, has failed due to an insufficient amount of space at the target resource or at a queue in a path to the target resource;

second program instructions to send a ticket containing a wait counter value to the transaction source;

third program instructions to store the wait counter value in an entry of a pending transaction table and to maintain an association with the transaction;

fourth program instructions to increment a service counter each time a transaction is completed at the target resource;

fifth program instructions to broadcast, by a number of sideband signals available for snooping by a plurality of transaction sources, a service counter value to the transaction source each time the service counter is incremented;

sixth program instructions to determine whether the wait counter value in the entry of the pending transaction table matches the service counter value received from a broadcast by the transaction target;

seventh program instructions to reattempt, by the at least one transaction source, the transaction in response to the wait count value matching the service counter value;

eighth program instructions to release the target resource in response to a failure of the transaction source to retry a transaction within an appropriate period of time;

wherein the first through the eighth program instructions are stored in the computer readable medium for execution by the processor via the computer readable memory.

2. A method of sharing resources in a computer system, comprising:

- determining, by a processor, whether a transaction, requested from a target resource by a transaction source, has failed due to an insufficient amount of space at the target resource or at a queue in a path to the target resource;
- sending, by the processor, a ticket containing a wait counter value to the transaction source;
- storing, by the processor, the wait counter value in an entry of a pending transaction table and to maintain an association with the transaction;
- incrementing a service counter each time a transaction is completed at the target resource;
- broadcasting, using a number of sideband signals available for snooping by a plurality of transaction sources, a service counter value to the transaction source each time the service counter is incremented;
- determining whether the wait counter value in the entry of the pending transaction table matches the service counter value received from a broadcast by the transaction target;
- reattempting, by the at least one transaction source, the transaction in response to the wait count value matching the service counter value; and
- releasing the target resource in response to a failure of the transaction source to retry a transaction within an appropriate period of time.

3. A computer program product comprising:

a computer readable storage device;

first program instructions to determine whether a transaction, requested from a target resource by a transaction source, has failed due to an insufficient amount of space at the target resource or at a queue in a path to the target resource;

second program instructions to send a ticket containing a wait counter value to the transaction source;

third program instructions to store the wait counter value in an entry of a pending transaction table and to maintain an association with the transaction;

fourth program instructions to increment a service counter each time a transaction is completed at the target resource;

fifth program instructions to broadcast, by a number of sideband signals available for snooping by a plurality of transaction sources, a service counter value to the transaction source each time the service counter is incremented;

sixth program instructions to determine whether the wait counter value in the entry of the pending transaction table matches the service counter value received from a broadcast by the transaction target;

seventh program instructions to reattempt, by the at least one transaction source, the transaction in response to the wait count value matching the service counter value;

eighth program instructions to release the target resource in response to a failure of the transaction source to retry a transaction within an appropriate period of time wherein the first through the eighth program instructions are stored in the computer readable medium.

* * * * *